US011258620B2

(12) United States Patent
Jouhikainen et al.

(10) Patent No.: US 11,258,620 B2
(45) Date of Patent: *Feb. 22, 2022

(54) MANAGING MEETING DATA

(71) Applicant: Capital One Services, LLC, McLean, VA (US)

(72) Inventors: Hannes Jouhikainen, McLean, VA (US); Zviad Aznaurashvili, McLean, VA (US); Timur Sherif, Washington, DC (US); Steve Blanchet, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,914

(22) Filed: Feb. 12, 2021

(65) Prior Publication Data

US 2021/0167980 A1 Jun. 3, 2021

Related U.S. Application Data

(63) Continuation of application No. 16/740,762, filed on Jan. 13, 2020, now Pat. No. 10,924,292, which is a continuation of application No. 16/289,323, filed on Feb. 28, 2019, now Pat. No. 10,536,289, which is a continuation of application No. 16/116,600, filed on Aug. 29, 2018, now Pat. No. 10,263,799.

(51) Int. Cl.
*G06F 15/16* (2006.01)
*H04L 12/18* (2006.01)
*G06F 16/907* (2019.01)
*G06Q 10/00* (2012.01)
*G06Q 10/10* (2012.01)

(52) U.S. Cl.
CPC ........ *H04L 12/1831* (2013.01); *G06F 16/907* (2019.01); *G06Q 10/00* (2013.01); *G06Q 10/109* (2013.01); *H04L 12/1818* (2013.01)

(58) Field of Classification Search
None
See application file for complete search history.

(56) References Cited

U.S. PATENT DOCUMENTS 6,029,124 A   2/2000   Gillick et al.
8,914,452 B2  12/2014  Boston et al.
(Continued)

OTHER PUBLICATIONS

Cogi, Inc., "Create Accurate Meeting Minutes by Capturing the Details," 2008, 4 pages.

(Continued)

*Primary Examiner* — Quang N Nguyen
(74) *Attorney, Agent, or Firm* — Harrity & Harrity, LLP

(57) ABSTRACT

A device may receive meeting data associated with a first meeting, the first meeting having previously occurred. The device may obtain, based on the meeting data, data identifying at least one individual associated with the first meeting and data identifying at least one topic associated with the first meeting. In addition, the device may identify a second meeting based on the at least one individual or the at least one topic, the second meeting having not yet occurred. The device may provide, to a user device associated with the second meeting and based on identifying the second meeting, at least a portion of the meeting data associated with the first meeting.

18 Claims, 6 Drawing Sheets

(56) References Cited

U.S. PATENT DOCUMENTS

| | | | |
|---|---|---|---|
| 10,263,799 B1 | 4/2019 | Jouhikainen et al. | |
| 10,536,289 B1 | 1/2020 | Jouhikainen et al. | |
| 10,924,292 B2 | 2/2021 | Jouhikainen et al. | |
| 11,012,575 B1* | 5/2021 | Leblang | H04M 3/567 |
| 2003/0182310 A1* | 9/2003 | Charnock | G06Q 10/10 |
| 2004/0186712 A1 | 9/2004 | Coles et al. | |
| 2013/0262595 A1 | 10/2013 | Srikrishna et al. | |
| 2014/0129576 A1 | 5/2014 | Bank et al. | |
| 2014/0207510 A1 | 7/2014 | Valle | |
| 2014/0244743 A1 | 8/2014 | Beerse et al. | |
| 2015/0067023 A1 | 3/2015 | Al et al. | |
| 2017/0286853 A1 | 10/2017 | Liensberger et al. | |
| 2017/0308866 A1 | 10/2017 | Dotan-Cohen et al. | |
| 2018/0007098 A1 | 1/2018 | Malatesha et al. | |
| 2018/0046957 A1* | 2/2018 | Yaari | G06Q 10/1095 |
| 2018/0077099 A1 | 3/2018 | Silva et al. | |
| 2018/0232705 A1 | 8/2018 | Baker et al. | |
| 2019/0074987 A1 | 3/2019 | Wiener et al. | |
| 2019/0098255 A1 | 3/2019 | Bergmann et al. | |
| 2019/0273767 A1 | 9/2019 | Nelson et al. | |
| 2019/0362452 A1 | 11/2019 | Brunets et al. | |
| 2020/0228358 A1 | 7/2020 | Rampton | |
| 2020/0279567 A1* | 9/2020 | Adlersberg | G06F 40/279 |
| 2021/0233037 A1* | 7/2021 | Ohm | H04L 12/1831 |

OTHER PUBLICATIONS

Ehrlich K., et al., "Searching for Experts in the Enterprise: Combining Text and Social Network Analysis," 2007, 10 pages.

Lenke, "How the Technology Transcribing your Meetings Actually Works," 2016, 8 pages.

Nuance Communications, Inc., "Introducing the Nuance Transcription Engine: Transforms Speech and Audio into Big Data," 2016, 1 page.

Perez, "Otter's New App lets you Record, Transcribe, Search and Share your Voice Conversations," 2018, 12 pages.

\* cited by examiner

MANAGING MEETING DATA

RELATED APPLICATIONS

This application is a continuation of U.S. patent application Ser. No. 16/740,762, filed Jan. 13, 2020 (now U.S. Pat. No. 10,924,292), which is a continuation of U.S. patent application Ser. No. 16/289,323, filed Feb. 28, 2019 (now U.S. Pat. No. 10,536,289), which is a continuation of U.S. patent application Ser. No. 16/116,600, filed Aug. 29, 2018 (now U.S. Pat. No. 10,263,799), which are incorporated herein by reference.

BACKGROUND

Meetings between individuals often take place using a variety of telecommunications devices and for a variety of purposes. Meetings may involve a variety of different individuals and span a variety of topics.

SUMMARY

According to some implementations, a method may comprise: receiving, by a device, meeting data associated with a first meeting, the first meeting having previously occurred; obtaining, by the device and based on the meeting data, data identifying at least one individual associated with the first meeting; obtaining, by the device and based on the meeting data, data identifying at least one topic associated with the first meeting; identifying, by the device, a second meeting based on the at least one individual or the at least one topic, the second meeting having not yet occurred; and providing, by the device and to a user device associated with the second meeting and based on identifying the second meeting, at least a portion of the meeting data associated with the first meeting.

According to some implementations, a device may comprise: one or more memories; and one or more processors, communicatively coupled to the one or more memories, configured to: receive first meeting data associated with a first meeting, the first meeting having not yet occurred; obtain, based on the first meeting data, data identifying at least one individual associated with the first meeting; obtain, based on the first meeting data, data identifying at least one topic associated with the first meeting; provide, to a meeting relevance model, the data identifying the at least one individual associated with the first meeting and the data identifying at least one topic associated with the first meeting, the meeting relevance model being trained to produce, as output, data identifying a second meeting and a measure of confidence that the second meeting is relevant to the first meeting, the second meeting having previously occurred; determine that the second meeting is relevant to the first meeting based on the output of the meeting relevance model; and provide, to a user device associated with the first meeting, at least a portion of second meeting data associated with the second meeting.

According to some implementations, a non-transitory computer-readable medium may store instructions, the instructions comprising: one or more instructions that, when executed by one or more processors, cause the one or more processors to: receive first meeting data associated with a first meeting, the first meeting having previously occurred; obtain, based on the first meeting data, data identifying at least one topic associated with the first meeting; receive second meeting data associated with a second meeting, the second meeting having previously occurred; obtain, based on the second meeting data, data identifying at least one topic associated with the second meeting; determine, based on the at least one topic associated with the first meeting and the at least one topic associated with the second meeting, that the first meeting is relevant to the second meeting; and provide, to a user device associated with the first meeting, at least a portion of the second meeting data.

DETAILED DESCRIPTION

Figure 1:
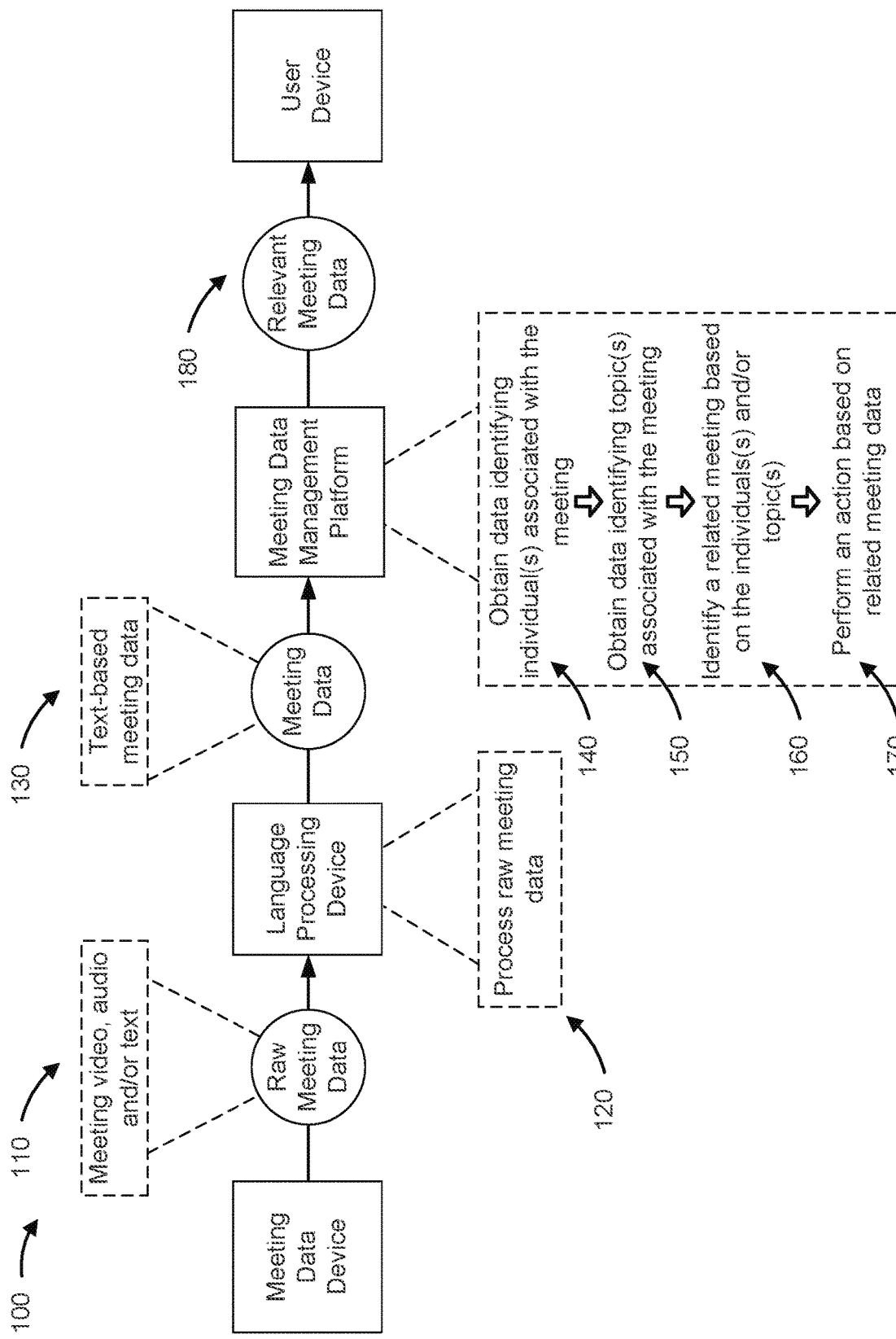
FIG. 1 is a diagram of an example implementation described herein.

The following detailed description of example implementations refers to the accompanying drawings. The same reference numbers in different drawings may identify the same or similar elements.

Meetings frequently take place among a variety of individuals associated with a variety of organizations and associated with a variety of topics. Often, an individual uses software to set up a meeting; the individual setting up the meeting is typically responsible for inviting others to the meeting, creating the meeting time, describing the meeting, and so on. However, the individual setting up a meeting may not be aware of other, similar meetings, between the same or similar individuals or on the same or similar topics. In this situation, the individual setting up the meeting may neglect to invite individuals that would be valuable to invite to the meeting, and the meeting may be set up with incomplete information that might have been useful to know or include from previous meetings, or from previously scheduled meetings.

Some implementations, described herein, provide a meeting data management platform that is capable of managing meeting data in a manner designed to facilitate scheduling meetings and sharing information regarding meetings based on information regarding previous (and/or previously scheduled) meetings. For example, a meeting data management platform may receive meeting data associated with a meeting that previously occurred. The meeting data may include a variety of information regarding the meeting, including information identifying the individuals associated with the meeting and information identifying one or more topics associated with the meeting. The meeting data may be stored in a data structure and used to perform a variety of actions. For example, the meeting data management platform may determine that a new meeting, which has yet to occur, is related to a previously occurring meeting. The determination may be made, for example, based on similarities between individuals and/or topics associated with the previously occurring meeting and the new meeting. After identifying meetings that are related, the meeting data management platform may perform a variety of actions, such as suggesting that an individual associated with the previously occurring meeting be invited to the new meeting, providing an organizer of the new meeting with a transcript of the previously occurring meeting, providing information regarding the new meeting to an individual associated with the previously occurring meeting, and/or the like.

In this way, the meeting data management platform may facilitate the management of meeting data in a manner designed to increase the ease and efficiency of scheduling meetings and increase awareness between individuals regarding related meetings. For example, scheduling meetings may be made easier and more efficient than traditional manual meeting scheduling by suggesting individuals to be added to a meeting and/or suggesting content from previous meetings that can be included in a new meeting. Increased awareness between individuals may be provided by sharing information related to meetings between meetings and individuals associated with the meetings. Several different stages of the process for managing meeting data are automated, which can improve speed and efficiency of the process and conserve computing resources (e.g., processor resources, memory resources, and/or the like). Furthermore, implementations described herein use a rigorous, computerized process to perform tasks or roles that were not previously performed. Also, automating the process for managing meeting data conserves computing resources (e.g., processor resources, memory resources, and/or the like) that would otherwise be wasted by using manual processes for attempting to determine individuals who should be invited to a meeting, identify content relevant to include in a meeting invitation, notify individuals related to the meeting, and/or the like.

FIG. 1 is a diagram of an example implementation 100 described herein. As shown in FIG. 1, example implementation 100 includes a meeting data device (e.g., a telecommunications device, mobile device, personal computer, telecommunications server, and/or the like) that is associated with a meeting, such as a computer used by a meeting participant for a meeting, a telecommunications broker server facilitating a meeting between multiple devices, and/or the like; a language processing device (e.g., a server computer, a cloud computing platform, and/or the like) designed to process information regarding a meeting and turn the information into meaningful meeting data; a meeting data management platform (e.g., a server computer, a cloud computing platform, and/or the like) designed to facilitate the management of meeting data; and a user device (e.g., a personal computer, mobile device, server computer, and/or the like) designed to interact with the meeting data management platform in a variety of ways. While the devices of implementation 100 are depicted separately, in some implementations, the functionality of one or more of the devices of implementation 100 can be included in another device, or can be included in multiple, distributed devices.

As shown by reference number 110, the meeting data device provides raw meeting data to the language processing device. As noted above, the meeting data device may include a device associated with a meeting, such as a personal computer used by a meeting participant for a meeting, a telecommunications broker server facilitating a meeting between multiple devices, and/or the like. The language processing device may include a device designed to process information regarding a meeting (e.g., raw meeting data) and turn the information into meaningful meeting data. While the language processing device is depicted as being separate from the meeting data device and meeting data management platform, in some implementations, the language processing device may be included in the meeting data device or meeting data management platform.

The raw meeting data may include a variety of information associated with a meeting that was previously scheduled, or which previously occurred. For example, the raw meeting data may include a voice recording associated with the first meeting, a video recording associated with the first meeting, a transcript associated with the first meeting, a chat log associated with the first meeting, text included in a meeting invite associated with the first meeting, data associated with at least one attachment associated with the first meeting, and/or the like. In some implementations, the raw meeting data may include information that is designed to be processed by a natural language processing device (e.g., the language processing device) to obtain various features of the raw meeting data, including topic information (e.g., where the raw meeting data may be categorized, labeled, or otherwise associated with one or more topics), as described in further detail below.

As shown by reference number 120, the language processing device processes the raw meeting data to produce useful meeting data that may be used to facilitate scheduling meetings and transferring information between individuals. In some implementations, the language processing device may use a variety of machine learning techniques, including natural language processing techniques, to process the raw meeting data. For example, a speech recognition model may be trained to convert speech found in audio and video into text. The language processing device may use the speech recognition model to generate a transcript of the meeting associated with the raw meeting data. As another example, a voice recognition model may be trained (e.g., using previous audio/video data from previous meetings) to identify individuals speaking during the meeting. In this situation, a transcript of the meeting may be annotated with information identifying the individuals speaking, and the times at which the individuals are speaking, in a manner designed to produce an annotated transcript of the meeting. Another example machine learning technique may include training and using a topic model to identify one or more topics that are relevant to the meeting and/or the individuals associated with the meeting. In this situation, the language processing device may use text-based data associated with the meeting (e.g., including a transcript) to label the meeting as being relevant to one or more topics, and/or labeling individuals associated with the meeting as being relevant to one or more topics. Whether the meeting or an individual is labeled as being relevant to a particular topic may be based on any of the raw meeting data or meeting data that has been processed by the language processing device.

In some implementations, metadata associated with the meeting may be used by the language processing device to facilitate the training and/or use of a variety of machine learning models. For example, the raw meeting data may include or otherwise be associated with data identifying the individuals invited to and/or participating in the meeting (e.g., identified by user identifiers, names, job position, phone numbers, MAC addresses, and/or the like). In this situation, the data identifying the individuals invited to and/or participating in the meeting may be used to increase the accuracy of the voice recognition model (e.g., by limiting the number of voices that the language processing device may recognize for the meeting).

As another example, the raw meeting data may include or otherwise be associated with data identifying a role, title, and/or the like, associated with the individuals invited to and/or participating in the meeting. In this situation, the data identifying roles, titles, and/or the like, may be used to increase the accuracy of a topic identification and/or labeling model (e.g., by weighting topics in a manner designed to increase the likelihood that an individual will be labeled with a topic that is associated with the individual's role and/or title). As another example, the raw meeting data may include or otherwise be associated with data identifying a conference room or other meeting location or software associated with the meeting. In this situation, the data identifying the conference room or other meeting location or software may be used to schedule a conference room, identify software to be used for a meeting, order food for a meeting, have products delivered to the meeting, and/or the like. As another example, information regarding how often an individual actively participated (e.g., presented or spoke) in the meeting may affect whether the individual is labeled (and/or a confidence score for the label) as being associated with a topic.

A variety of other types of raw meeting data may be used to identify one or more topics associated with the meeting and/or individuals associated with the meeting. For example, data indicating whether an individual attended a meeting in person or remotely may affect the likelihood of the individual being labeled as associated with a particular topic. In another example, data identifying a job title associated with the individuals attending the meeting may be used to identify one or more topics to be associated with the meeting and/or the individuals.

In some implementations, the language processing device may derive text (e.g., for use in topic identification), from other types of data associated with the meeting, and which may be included in or otherwise associated with the raw meeting data. For example, the language processing device may derive text from an attachment associated with the meeting, such as a digital document or presentation, and use the text in one or more models for identifying one or more topics to be associated with the meeting and/or one or more individuals associated with the meeting. As another example, text included in a meeting invitation, including the subject line and text associated with the meeting invitation, may be used by the language processing device when using one or more of the example models described above.

In some implementations, the language processing device may produce, as output from one of the machine learning models applied to the raw meeting data, confidence scores that indicate a measure of confidence associated with the machine learning model output. For example, each topic produced by a topic identification model may be associated with a measure of confidence that the topic identification model correctly labeled a meeting or individual as being relevant to the topic. In a situation where topics are associated with confidence scores, the confidence scores may be used in a variety of ways. In some implementations, a confidence score threshold may be used, e.g., by labeling the meeting or an individual as relevant to a particular topic only in a situation where the confidence score associated with the label meets a threshold measure of confidence. In some implementations, confidence scores may be used to limit the number of topics identified as being associated with the meeting or an individual (e.g., by limiting the number of topics to the N topics with the highest measures of confidence, where N is a positive integer).

In this way, the language processing device may process the raw meeting data to obtain a transcript associated with the meeting, identify one or more topics associated with the meeting, and/or identify one or more topics associated with one or more individuals associated with the meeting. The ability to process raw meeting data may be useful to provide the meeting data management platform with meeting data that can be used to facilitate the management of meeting data for the meeting (and for many other meetings).

As shown by reference number 130, the meeting data management platform receives meeting data from the language processing device. As noted above, the meeting data may include a variety of information regarding the meeting. For example, the meeting data may include a voice recording associated with the first meeting, a video recording associated with the first meeting, a transcript associated with the first meeting, data identifying individuals invited to the first meeting, data identifying individuals attending the first meeting, data identifying roles associated with the individuals invited to the first meeting (e.g., the role within the meeting and/or an organization), data identifying roles associated with the individuals attending the first meeting, a subject associated with the first meeting, text included in a meeting invite associated with the first meeting, one or more topics associated with the first meeting, one or more topics associated with one or more individuals associated with the meeting, data associated with at least one attachment associated with the first meeting, data identifying a location of the first meeting, data identifying individuals attending the first meeting in person, data identifying individuals attending the first meeting remotely, software used to conduct the first meeting, products and/or services associated with the first meeting (e.g., food served, equipment reserved, and/or the like), data identifying a job title associated with the individuals attending the first meeting, and/or the like. In some implementations, the meeting data is text-based (e.g., the meeting data does not include audio or video but includes text, such as a transcript).

In some implementations, the meeting data specifies one or more topics associated with the meeting, and the meeting data may include a measure of confidence associated with each of the one or more topics associated with the meeting. In some implementations, the meeting data specifies, for at least one individual associated with the meeting, one or more topics associated with the individual, and the meeting data may include a measure of confidence associated with each of the one or more topics associated with the individual.

In some implementations, the meeting data management platform may receive the meeting data based on a request for the meeting data. For example, in some implementations, the meeting data platform may receive the raw meeting data (e.g., from the meeting data device, the user device, or a different device). In this situation, the meeting data management platform may send a request to the language processing device, to cause the language processing device to process the raw meeting data and provide the meeting data management platform with meeting data.

The meeting data received by the meeting data management platform enables the meeting data management platform to perform a variety of actions related to meeting data management.

As shown by reference number 140, the meeting data management platform obtains data identifying one or more individuals associated with the meeting. As noted above, the meeting data may include data identifying one or more individuals associated with the meeting. For example, the one or more individuals may include the meeting organizer, individuals invited to the meeting, individuals attending the meeting, and/or the like. Individuals associated with the meeting may be identified in a variety of ways, such as by name, user name, job title, user account identifier, phone number, computer IP address, and/or the like.

In some implementations, the meeting data management platform may store data identifying the individuals associated with the meeting. The data may be stored in a data structure, such as a database, list, table, and/or the like, in a manner designed to associate individuals with the meetings the individuals are, or were, associated with. In some implementations, an individual may be identified in multiple different ways. For example, in one meeting, an individual may use computer software that identifies the user account associated with the user; in another meeting, the individual may call in using a telephone that is associated with a phone number. When storing data regarding an individual, each individual may be associated with multiple methods of identification, enabling the meeting data management platform to store data regarding individuals in a manner designed to enable identifying an individual from any method of identification included in the meeting data.

As shown by reference number 150, the meeting data management platform obtains data identifying one or more topics associated with the meeting. As noted above, the meeting data may include data identifying one or more topics associated with the meeting and/or the individuals associated with the meeting. For example, the meeting may be identified as being associated with multiple topics (e.g., based on the transcript of the meeting, attachments associated with the meeting, the individuals associated with the meeting, and/or the like). As another example, individuals associated with the meeting may each be associated with one or more topics (e.g., based on the individual's involvement in the meeting, portions of the transcript attributable to the individual, the individual's role or title within an organization, and/or the like).

In some implementations, the meeting data management platform may store data specifying the topics associated with the meeting and/or the topics associated with the individuals associated with the meeting. The data may be stored in a data structure, such as a database, list, table, and/or the like, in a manner designed to associate topics with the meeting and the individuals associated with the meeting. In some implementations, the data structure may be the same data structure described above as storing data identifying the individuals associated with the meeting. In a situation where confidence scores are provided for topics identified by the language processing device, the meeting data management platform may also store, for each topic, a measure of confidence that the topic is associated with the meeting and/or individual.

In some implementations, the meeting data management platform may store meeting data and/or data specifying the topics associated with the meeting and/or the topics associated with the individuals associated with the meeting in a manner designed to enable searching for data regarding the meeting, an individual associated with the meeting, and/or a topic associated with the meeting. In some implementations, the foregoing data may be stored in a data structure along with similar data for many other meetings, individuals, and/or topics. In this way, the meeting data management platform may provide the ability to search for meetings and/or individuals related to a particular topic, search for topics related to an individual and/or meeting, and/or the like. For example, in a situation where the foregoing data is stored in a data structure, a user may query the data structure for a particular topic, and the meeting data management platform may provide meetings and individuals associated with the particular topic in response to the query. In implementations where measures of confidence are used, search results may be ordered based on the measure of confidence (e.g., when searching for a particular topic, individuals and meetings with high measures of relevance to the searched topic may be ranked higher than individuals and meetings with relatively low measures of relevance to the searched topic).

In some implementations, the meeting data management platform may secure meeting data (including data specifying topics that are relevant to particular meetings and/or individuals) in a manner designed to restrict access to meeting data and data associating topics with individuals and/or meetings. For example, user account controls may be used, where user accounts are permitted access to particular subsets of data (e.g., a user account associated with a particular organization may be able to access data regarding meetings and individuals within the particular organization). Other forms of security, including encryption, multi-factor authentication, and/or the like, may also be used, in some implementations, to secure access to meeting data stored by the meeting data management platform.

As shown by reference number 160, the meeting data management platform identifies a related meeting based on the one or more individuals and/or topics associated with the meeting (the "first" meeting). As described in further detail, below, the meeting data management platform identifies a related meeting to enable the performance of a variety of actions associated with the related meeting. In some implementations, the related meeting may be a meeting that previously occurred. In some implementations, the related meeting may be a meeting that has not yet occurred (e.g., a meeting that is being scheduled or has been scheduled). The related meeting may be identified in a variety of ways.

In some implementations, the related meeting may be identified (e.g., as being related to first meeting) based on one or more topics associated with the related meeting. As noted above, the first meeting may be associated with multiple topics (e.g., including the topics that are associated with the individuals associated with the first meeting). In a situation where the related meeting is also associated with one or more topics, the related meeting may be identified based on similarities between the topics. For example, the related meeting may be identified (e.g., identified as being related to the first meeting) based on the related meeting's association with topics that are similar to or the same as one or more of the topics associated with the first meeting. In some implementations, one or more thresholds may be used to determine whether a meeting is related to the first meeting. For example, a meeting may be identified as related in a situation where a threshold number of topics associated with the first meeting match the meeting.

In a situation where confidence scores are used to indicate a measure of confidence that topics are associated with meetings, the measures of confidence may also be used to identify the related meeting. For example, the related meeting may be identified as related in a situation where the measures of confidence for the topics associated with the related meeting meet or exceed a threshold measure of relevance (e.g., for the topics that match between the first meeting and the related meeting).

In some implementations, the related meeting may be identified from multiple meetings. For example, in a situation where the meeting data management platform stores meeting data (e.g., including associated topics) for multiple meetings, multiple meetings may be associated with topics that are similar to or the same as the topics associated with the first meeting. In this situation, the meeting data management platform may identify, as the related meeting, the most relevant meeting (e.g., based on similar and/or matching topics, and relevance scores). In some implementations, the meeting data management platform may identify multiple meetings as related meetings. For example, the meeting data management platform may identify, as related meetings, a predetermined number of the most relevant meetings. As another example, the meeting data management platform may identify, as related meetings, each meeting that exceeds a threshold measure of relevance associated to the first meeting.

In some implementations, the meeting data management platform may identify the related meeting by using one or more machine learning techniques. For example, the meeting data management platform may train and use a meeting relevance model to determine which meetings are related to one another (and, in some implementations, a degree to which the meetings are related). The meeting data management platform may train the meeting relevance model using one or more supervised machine learning techniques and based on training data that includes information identifying previous meetings and determinations regarding which meetings are relevant to one another.

The meeting data management platform may use a variety of information included in meeting data as machine learning features to be used in training and using the meeting relevance model. For example, the machine learning features may include one or more of: data identifying individuals invited to the meeting, data identifying individuals attending the meeting, data identifying roles associated with the individuals invited to the meeting, data identifying roles associated with the individuals attending the meeting, a subject associated with the meeting, at least one topic associated with the meeting (including topics associated with the meeting and/or the individuals associated with the meeting), data identifying at least one attachment associated with the meeting, and/or the like.

The meeting relevance model may be trained to receive meeting data associated with a meeting as input and produce, as output, data identifying a second meeting and a measure of confidence that the second meeting is relevant to the first meeting. In some implementations, the meeting relevance model may produce data identifying multiple meetings as output, with corresponding measures of confidence for each meeting produced as output. Based on the output of the meeting relevance model, including the measures of confidence, the meeting data management platform may identify one or more meetings as being related to the first meeting.

The ability to identify a meeting as being related to the first meeting may enable the meeting data management platform to perform a variety of actions designed to facilitate meeting scheduling and/or the sharing of knowledge between individuals.

As shown by reference number 170, the meeting data management platform performs an action based on the meeting data associated with the related meeting. As noted above, the meeting data management platform may perform a variety of actions designed to facilitate meeting scheduling and/or the sharing of knowledge between individuals. For example, and as described in further detail below, the meeting data management platform may suggest individuals and/or content to be added to a meeting that has not yet occurred; automatically provide meeting information for a previously occurring meeting to an individual related to topic associated with the meeting, automatically schedule a meeting room for a meeting, and/or the like.

In some implementations, the meeting data management platform may provide at least a portion of the meeting data to a user device associated with an individual associated with the related meeting. The meeting data provided to the user device may be based on the meeting data used to identify the related meeting (e.g., data related to topics and/or individuals). For example, in a situation where the related meeting has not yet occurred (e.g., the meeting is being scheduled or was previously scheduled), the meeting data management platform may provide, to a user device associated with the organizer of the related meeting, meeting data associated with the first meeting that might be relevant to include in the related meeting. The meeting data provided to the user device may include suggested individuals (e.g., invitees or attendees of the first meeting) to invite to the related meeting, a transcript of the first meeting, an attachment associated with the first meeting, a suggested subject for the meeting invitation, a suggested conference room to schedule, and/or the like.

In some implementations, the meeting data management platform may provide at least a portion of meeting data associated with the related meeting to a user device associated with an individual associated with the first meeting. For example, in a situation where the related meeting has not yet occurred, the meeting data management platform may provide, to a user device associated with an individual (e.g., an individual associated with one or more topics), meeting data that might be relevant to provide to the individual. For example, the meeting data provided to the user device, in this situation, may include data notifying the individual that a meeting relevant to the individual is scheduled (or is being scheduled), data identifying the meeting organizer associated with the related meeting, and/or other information which the meeting organizer may have agreed to share with individuals relevant to the related meeting.

In some implementations, the meeting data management platform may provide meeting data to a user device during a meeting and/or perform another action during a meeting. For example, during a meeting, the meeting data management platform may receive meeting data from a meeting data device and identify a related meeting based on the meeting data provided during the meeting. The meeting data may be provided, during the meeting, to a user device associated with an individual participating in the meeting, thus enabling the individual using the user device to take action based on the meeting data. By way of example, during a meeting, a discussion regarding a particular person or product may arise. Based on a transcript of the meeting (e.g., generated during the meeting), the meeting data management platform may determine that the meeting (which was previously not relevant to the particular person or product) is relevant to the particular person or product. In a situation where the meeting is identified as being relevant to the particular person, the organizer of the meeting may be prompted to invite the particular person to the meeting, enabling the particular person to join the meeting in progress in response to the particular person becoming relevant during the meeting. In a situation where the meeting is identified as being relevant to the product, the meeting data management platform may provide, to the individuals participating in the meeting, relevant meeting data (e.g., attachments, transcripts, and/or the like) regarding the product from a related meeting.

In some implementations, the meeting data management platform may schedule a new meeting between at least one individual associated with the first meeting and at least one individual associated with the related meeting. For example, based on the meeting data associated with the first meeting and/or the related meeting, the meeting data management platform may determine (e.g., based on meeting transcripts) that a third meeting is desirable between at least one individual associated with the first meeting and at least one individual associated with the related meeting. In this situation, the meeting data management platform may schedule a meeting, including scheduling a conference room (if applicable), and automatically send meeting invites to the individuals identified as relevant to the new meeting (e.g., based on topics associated with the individuals and/or the individuals' involvement in the first meeting and/or relevant meeting). When scheduling a meeting, the meeting data management platform may use other meeting data to take additional actions, such as using a previous transcript to determine food preference for the first meeting and automatically order food for the new meeting, determine equipment previously reserved for the meeting or similar meetings and automatically reserve equipment for the new meeting, and/or the like.

In some implementations, the meeting data management platform may provide meeting data as search results to a user device. For example, in a situation where the meeting data management platform stores meeting data and enables individuals to search for meeting data and/or individuals that are relevant to a particular topic, the meeting data management platform may receive a query for a particular topic, identify meeting data related to the topic, and provide search results that include at least a portion of the meeting data related to the topic.

In some implementations, the meeting data management platform may use various security measures, such as the data security measures described above, when performing one or more actions. For example, the individuals to which meeting data is provided, and/or the portions of meeting data provided, may depend on security settings designed to protect potentially sensitive meeting data from being provided to unauthorize and/or unintended recipients. Example security settings include user account verification, multi-factor authentication for meeting data sharing, and/or the like.

The ability to perform actions, such as those described above, based on meeting data, enable the meeting data management platform to manage meeting data in a manner designed to facilitate meeting scheduling and/or the sharing of knowledge between individuals. As a specific example, an individual working for an organization may schedule a meeting regarding the marketing for the release of a new product that competes with a competing organization's competing product. While the individual is setting up the meeting, and after providing the meeting data management platform with enough information (e.g., in the subject or text of the meeting invitation) to identify topics associated with the meeting (e.g., marketing, the new product, the competing organization, and the competing product), the meeting data management platform may identify a related individual that is relevant to the meeting based on the related individual's previous involvement in meetings associated with topics similar to marketing, the new product, the competitor, and/or the competitor's product. After identifying the related individual (e.g., the relevant meeting data), the meeting data management platform may suggest, to the individual, that the related individual should be invited to the meeting. After creation of the meeting, the meeting data management platform may identify a related meeting between other individuals that included a technical analysis of the differences between the new product and the competing product. Based on identifying the related meeting, the meeting data management platform may send meeting data associated with the related meeting to the individual setting up the meeting, such as a transcript of the related meeting, documents presented during the related meeting, and/or the like, which the individual may then choose to distribute to other individuals invited to the meeting. After the meeting, the meeting data may be analyzed and stored, in a manner designed to enable future use of the meeting data for scheduling meetings and sharing knowledge between individuals.

By performing one or more actions similar to those described above, the meeting data management platform may conserve both human and computing resources that would otherwise be used to manually identify previous meetings and/or individuals that might be related to another meeting. The actions may make meeting scheduling and knowledge transfer easier and more efficient than would otherwise be possible, or practicable.

As shown by reference number 180, the meeting data management platform provides relevant meeting data to the user device. For example, the user device of the example implementation 100 may be associated with an individual associated with the related meeting. The relevant meeting data may include at least a portion of the meeting data associated with the first meeting, e.g., in the form a suggested meeting invitee, a related document that was presented during the first meeting, and/or the like. In some implementations, the relevant meeting data may be provided by the meeting data management platform in response to a request from the user device (e.g., a request for meeting data relevant to a new meeting, a search query for meeting data related to a particular topic, and/or the like). While a single user device is depicted as receiving relevant meeting data, in some implementations, multiple user devices may receive the relevant meeting data, or at least a portion of the relevant meeting data. For example, in a situation where a relevant document is being provided, the meeting data management platform may provide the relevant document to multiple users associated with a meeting.

In this way, the meeting data management platform may facilitate the management of meeting data in a manner designed to increase the ease and efficiency of scheduling meetings and increase awareness between individuals regarding related meetings. For example, scheduling meetings may be made easier and more efficient than traditional manual meeting scheduling by suggesting individuals to be added to a meeting and/or suggesting content from previous meetings that can be included in a new meeting. Increased awareness between individuals may be provided by sharing information related to meetings between meetings and individuals associated with the meetings. Several different stages of the process for managing meeting data are automated, which can improve speed and efficiency of the process and conserve computing resources (e.g., processor resources, memory resources, and/or the like). Furthermore, implementations described herein use a rigorous, computerized process to perform tasks or roles that were not previously performed. Also, automating the process for managing meeting data conserves computing resources (e.g., processor resources, memory resources, and/or the like) that would otherwise be wasted by using manual processes for attempting to determine individuals who should be invited to a meeting, identify content relevant to include in a meeting invitation, notify individuals related to the meeting, and/or the like.

As indicated above, FIG. 1 is provided merely as an example. Other examples are possible and may differ from what was described with regard to FIG. 1.

Figure 2:
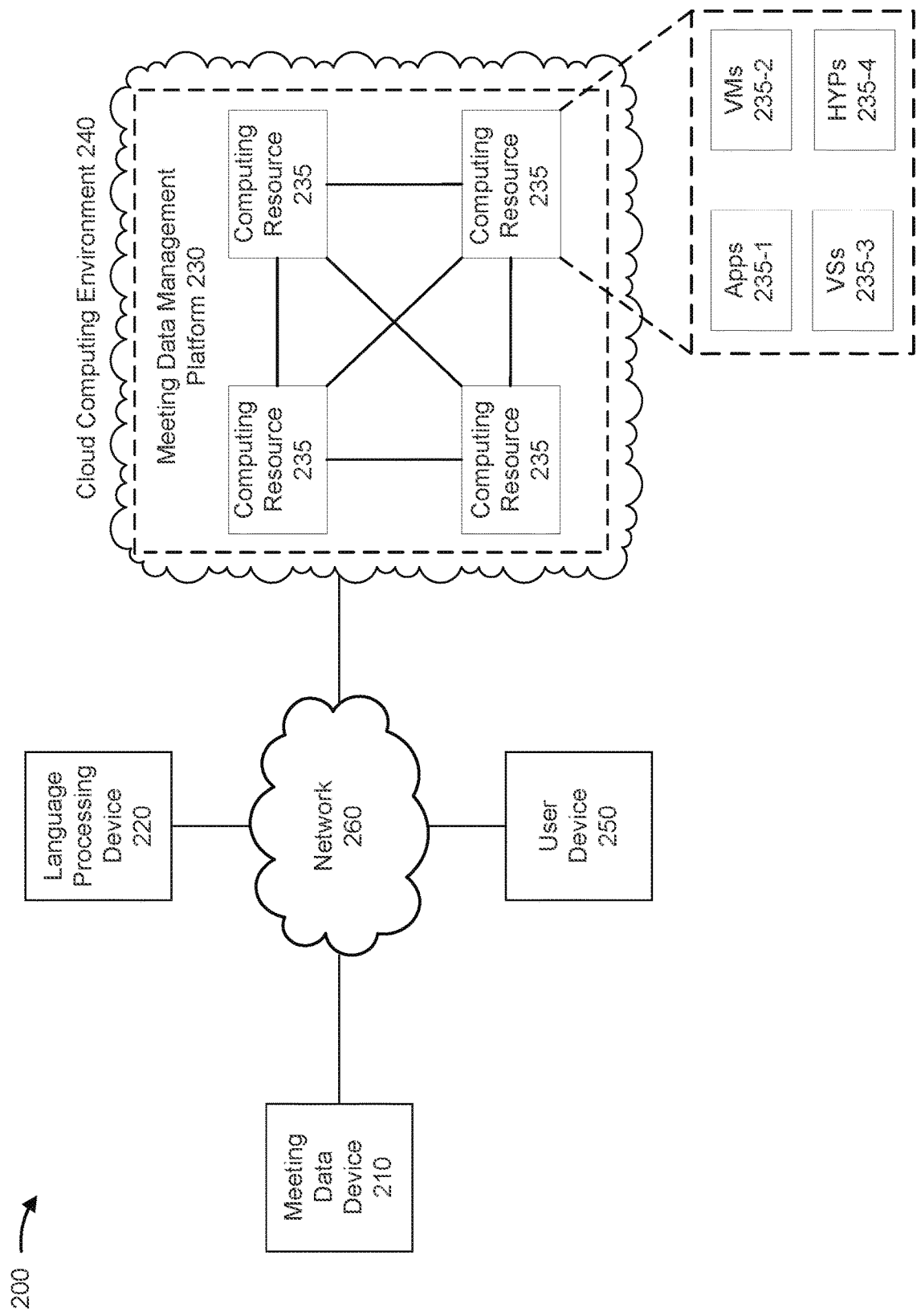
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a meeting data device 210, a language processing device 220, a meeting data management platform 230, a computing resource 235, a cloud computing environment 240, a user device 250, and a network 260. Devices of environment 200 may interconnect via wired connections, wireless connections, or a combination of wired and wireless connections.

Meeting data device 210 includes one or more devices capable of receiving, generating, storing, processing, and/or providing information associated with meetings and/or meeting data. For example, meeting data device 210 can include a communication and/or computing device, such as a mobile phone (e.g., a smart phone, a radiotelephone, etc.), a laptop computer, a tablet computer, server computer, or a similar type of device. Meeting data device 210 may record voice and video data associated with a meeting, obtain text associated with a meeting (e.g., meeting invitation text), obtain metadata associated with a meeting, and be capable of communicating raw meeting data to one or more other devices.

Language processing device 220 includes one or more devices capable of receiving, generating, storing, processing, and/or providing information associated with meeting data. For example, language processing device may include a server device (e.g., a host server, a web server, an application server, etc.), a data center device, or a similar device. Language processing device 220 may be capable of processing raw meeting data, including meeting audio and/or video, to obtain text-based meeting data that can be provided to meeting data management platform 230.

Meeting data management platform 230 includes one or more devices capable of receiving, generating, storing, processing, and/or providing information associated with meeting data. For example, meeting data management platform 230 may include a server device (e.g., a host server, a web server, an application server, etc.), a data center device, or a similar device. Meeting data management platform 230 may be capable of identifying meetings that are related to one another based on individuals and/or topics associated with the meetings and/or the individuals associated with the meetings. Based on meeting data associated with related meetings, meeting data management platform 230 may perform a variety of actions designed to facilitate the scheduling of meetings and/or sharing of information between individuals associated with meetings.

In some implementations, as shown, meeting data management platform 230 may be hosted in cloud computing environment 240. Notably, while implementations described herein describe meeting data management platform 230 as being hosted in cloud computing environment 240, in some implementations, meeting data management platform 230 may not be cloud-based (i.e., can be implemented outside of a cloud computing environment 240) or may be partially cloud-based.

Cloud computing environment 240 includes an environment that delivers computing as a service, whereby shared resources, services, etc. may be provided to meeting data management platform 230. Cloud computing environment 240 may provide computation, software, data access, storage, and/or other services that do not require end-user knowledge of a physical location and configuration of a system and/or a device that delivers the services. As shown, cloud computing environment 240 may include meeting data management platform 230 and computing resource 235.

Computing resource 235 includes one or more personal computers, workstation computers, server devices, or another type of computation and/or communication device. In some implementations, computing resource 235 may host meeting data management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 250 and/or meeting data management platform 230. Application 235-1 may eliminate a need to install and execute the software applications on user device 250 and/or meeting data management platform 230. For example, application 235-1 may include software associated with meeting data management platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 250), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

User device 250 includes one or more devices capable of receiving, generating, storing, processing, and/or providing information associated with meeting data. For example, user device 250 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 250 may be capable of providing a request for meeting data relevant to a related meeting, topic, and/or individual, and receiving relevant meeting data (e.g., from meeting data management platform 230).

Network 260 includes one or more wired and/or wireless networks. For example, network 260 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
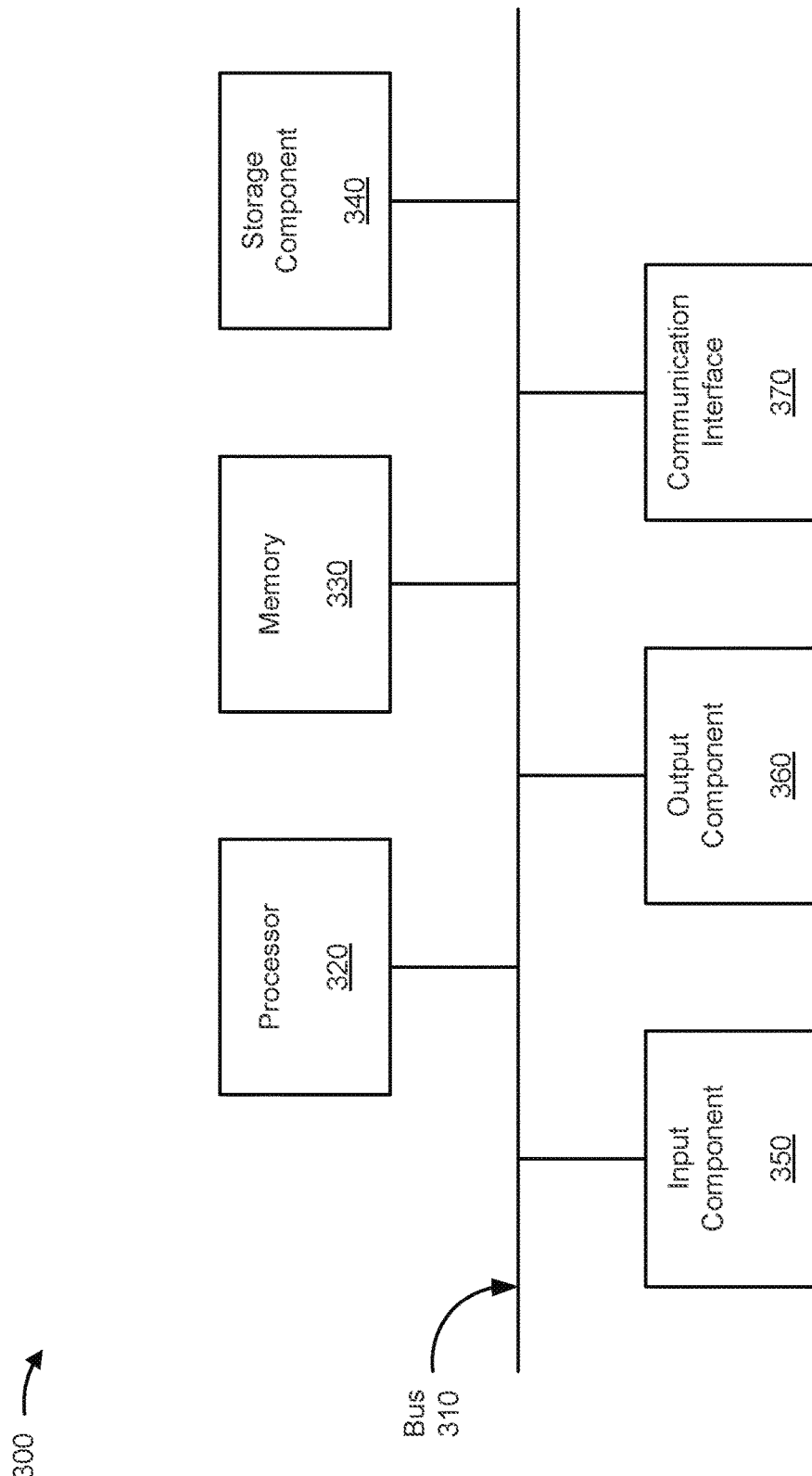
FIG. 3 is a diagram of example components of one or more devices of FIG. 2.

FIG. 3 is a diagram of example components of a device 300. Device 300 may correspond to meeting data device 210, language processing device 220, meeting data management platform 230, computing resource 235, and/or user device 250. In some implementations, meeting data device 210, language processing device 220, meeting data management platform 230, computing resource 235, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
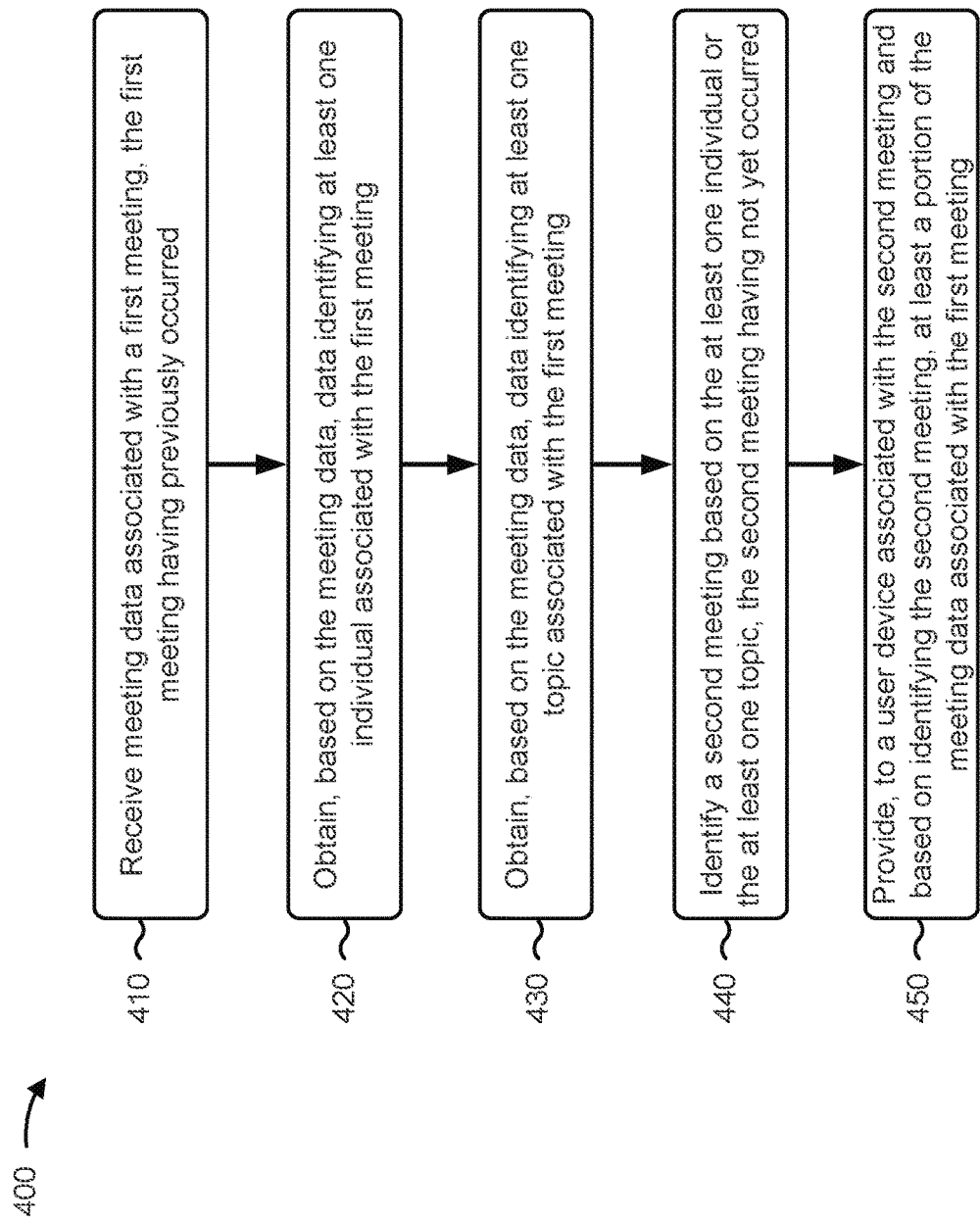
FIGS. 4-6 are flow charts of example processes for managing meeting data.

FIG. 4 is a flow chart of an example process 400 for managing meeting data. In some implementations, one or more process blocks of FIG. 4 may be performed by a meeting data management platform (e.g., meeting data management platform 230). In some implementations, one or more process blocks of FIG. 4 may be performed by another device or a group of devices separate from or including the meeting data management platform, such as a meeting data device (e.g., meeting data device 210), a language processing device (e.g., language processing device 220), a computing resource (e.g., computing resource 235), and/or a user device (e.g., user device 250).

As shown in FIG. 4, process 400 may include receiving meeting data associated with a first meeting, the first meeting having previously occurred (block 410). For example, the meeting data management platform (e.g., using computing resource 235, processor 320, memory 330, storage component 340, input component 350, communications interface 370, and/or the like) may receive meeting data associated with a first meeting, as described above in connection with FIG. 1. In some implementations, the first meeting previously occurred.

As further shown in FIG. 4, process 400 may include obtaining, based on the meeting data, data identifying at least one individual associated with the first meeting (block 420). For example, the meeting data management platform (e.g., using computing resource 235, processor 320, memory 330, storage component 340, input component 350, communications interface 370, and/or the like) may obtain, based on the meeting data, data identifying at least one individual associated with the first meeting, as described above in connection with FIG. 1.

As further shown in FIG. 4, process 400 may include obtaining, based on the meeting data, data identifying at least one topic associated with the first meeting (block 430). For example, the meeting data management platform (e.g., using computing resource 235, processor 320, memory 330, storage component 340, input component 350, communications interface 370, and/or the like) may obtain, based on the meeting data, data identifying at least one topic associated with the first meeting, as described above in connection with FIG. 1.

As further shown in FIG. 4, process 400 may include identifying a second meeting based on the at least one individual or the at least one topic, the second meeting having not yet occurred (block 440). For example, the meeting data management platform (e.g., using computing resource 235, processor 320, memory 330, storage component 340, input component 350, output component 360, communications interface 370, and/or the like) may identify a second meeting based on the at least one individual or the at least one topic, as described above in connection with FIG. 1. In some implementations, the second meeting did not yet occur.

As further shown in FIG. 4, process 400 may include providing, to a user device associated with the second meeting and based on identifying the second meeting, at least a portion of the meeting data associated with the first meeting (block 450). For example, the meeting data management platform (e.g., using computing resource 235, processor 320, memory 330, storage component 340, output component 360, communications interface 370, and/or the like) may provide, to a user device associated with the second meeting and based on identifying the second meeting, at least a portion of the meeting data associated with the first meeting, as described above in connection with FIG. 1.

Process 400 may include additional implementations, such as any single implementation or any combination of implementations described below.

In some implementations, the meeting data includes at least one of: a voice recording associated with the first meeting, a video recording associated with the first meeting, a transcript associated with the first meeting, data identifying individuals invited to the first meeting, data identifying individuals attending the first meeting, data identifying roles associated with the individuals invited to the first meeting, data identifying roles associated with the individuals attending the first meeting, a subject associated with the first meeting, text associated with a meeting invite associated with the first meeting, the at least one topic associated with the first meeting, or data associated with at least one attachment associated with the first meeting.

In some implementations, the meeting data was received from a meeting data device associated with the first meeting. In some implementations, process 400 may include storing, in a data structure, data specifying that the first meeting and the second meeting are relevant to one another. The data specifying that the first meeting and the second meeting are relevant to one another includes at least a portion of the meeting data associated with the first meeting and at least a portion of meeting data associated with the second meeting.

In some implementations, the data identifying at least one individual associated with the first meeting includes data identifying, for at least one of the at least one individual, data identifying an organizational role associated with the individual. In some implementations, identifying the second meeting based on the at least one individual or the at least one topic comprises: determining that an organizational role, associated with a particular individual included in the at least one individual associated with the first meeting, is relevant to a topic associated with the second meeting, and identifying the second meeting based on the determination that the organizational role, associated with the particular individual included in the at least one individual associated with the first meeting, is relevant to the topic associated with the second meeting. In some implementations, providing, to the user device associated with the second meeting, at least a portion of the meeting data associated with the first meeting comprises: providing, to the user device associated with the second meeting, data identifying the particular individual.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
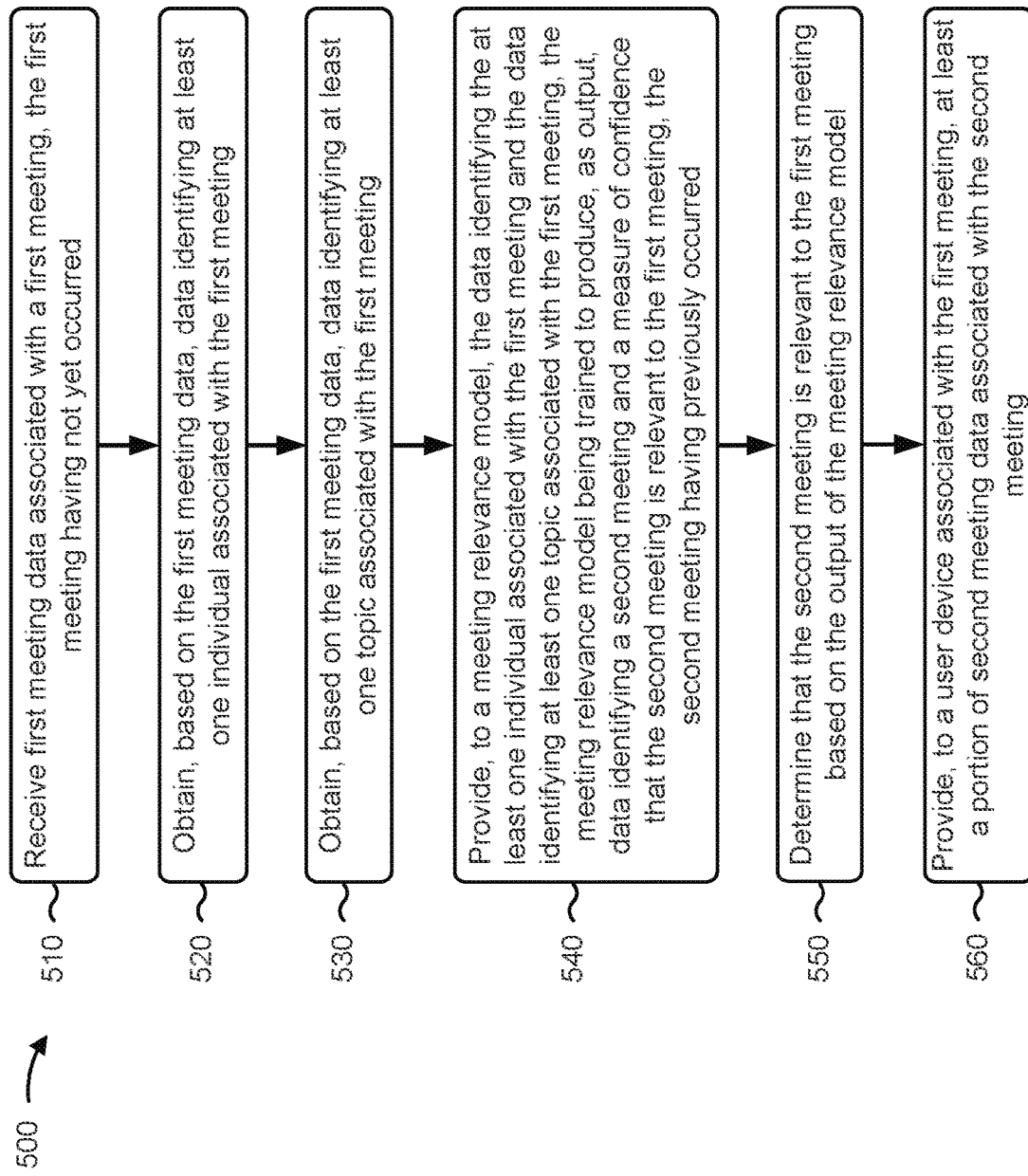

FIG. 5 is a flow chart of an example process 500 for managing meeting data. In some implementations, one or more process blocks of FIG. 5 may be performed by a meeting data management platform (e.g., meeting data management platform 230). In some implementations, one or more process blocks of FIG. 5 may be performed by another device or a group of devices separate from or including the meeting data management platform, such as a meeting data device (e.g., meeting data device 210), a language processing device (e.g., language processing device 220), a computing resource (e.g., computing resource 235), and/or a user device (e.g., user device 250).

As shown in FIG. 5, process 500 may include receiving first meeting data associated with a first meeting, the first meeting having not yet occurred (block 510). For example, the meeting data management platform (e.g., using computing resource 235, processor 320, memory 330, storage component 340, input component 350, communications interface 370, and/or the like) may receive first meeting data associated with a first meeting, as described above in connection with FIG. 1. In some implementations, the first meeting did not yet occur.

As further shown in FIG. 5, process 500 may include obtaining, based on the first meeting data, data identifying at least one individual associated with the first meeting (block 520). For example, the meeting data management platform (e.g., using computing resource 235, processor 320, memory 330, storage component 340, input component 350, communications interface 370, and/or the like) may obtain, based on the first meeting data, data identifying at least one individual associated with the first meeting, as described above in connection with FIG. 1.

As further shown in FIG. 5, process 500 may include obtaining, based on the first meeting data, data identifying at least one topic associated with the first meeting (block 530). For example, the meeting data management platform (e.g., using computing resource 235, processor 320, memory 330, storage component 340, input component 350, communications interface 370, and/or the like) may obtain, based on the first meeting data, data identifying at least one topic associated with the first meeting, as described above in connection with FIG. 1.

As further shown in FIG. 5, process 500 may include providing, to a meeting relevance model, the data identifying the at least one individual associated with the first meeting and the data identifying at least one topic associated with the first meeting, the meeting relevance model being trained to produce, as output, data identifying a second meeting and a measure of confidence that the second meeting is relevant to the first meeting, the second meeting having previously occurred (block 540). For example, the meeting data management platform (e.g., using computing resource 235, processor 320, memory 330, storage component 340, output component 360, communications interface 370, and/or the like) may provide to a meeting relevance model, the data identifying the at least one individual associated with the first meeting and the data identifying at least one topic associated with the first meeting, as described above in connection with FIG. 1. In some implementations, the meeting relevance model has been trained to produce, as output, data identifying a second meeting and a measure of confidence that the second meeting is relevant to the first meeting. In some implementations, the second meeting previously occurred.

As further shown in FIG. 5, process 500 may include determining that the second meeting is relevant to the first meeting based on the output of the meeting relevance model (block 550). For example, the meeting data management platform (e.g., using computing resource 235, processor 320, memory 330, storage component 340, and/or the like) may determine that the second meeting is relevant to the first meeting based on the output of the meeting relevance model, as described above in connection with FIG. 1.

As further shown in FIG. 5, process 500 may include providing, to a user device associated with the first meeting, at least a portion of second meeting data associated with the second meeting (block 560). For example, the meeting data management platform (e.g., using computing resource 235, processor 320, memory 330, storage component 340, output component 360, communications interface 370, and/or the like) may provide to a user device associated with the first meeting, at least a portion of second meeting data associated with the second meeting, as described above in connection with FIG. 1.

Process 500 may include additional implementations, such as any single implementation or any combination of implementations described below.

In some implementations, the first meeting data includes at least one of: data identifying one or more individuals invited to the first meeting, data identifying roles associated with the one or more individuals invited to the first meeting, a subject associated with the first meeting, text included in a meeting invite associated with the first meeting, the at least one topic associated with the first meeting, or data associated with at least one attachment associated with the first meeting.

In some implementations, process 500, when determining that the second meeting is relevant to the first meeting based on the output of the meeting relevance model, is to determine that the at least one topic associated with the first meeting is relevant to at least one topic associated with the second meeting and determine that the second meeting is relevant to the first meeting based on the determination that the at least one topic associated with the first meeting is relevant to the at least one topic associated with the second meeting.

In some implementations, process 500, when determining that the second meeting is relevant to the first meeting based on the output of the meeting relevance model, is to: determine that the at least one topic associated with the first meeting is relevant to at least one individual associated with the second meeting and determine that the second meeting is relevant to the first meeting based on the determination that the at least one topic associated with the first meeting is relevant to the at least one individual associated with the second meeting.

In some implementations, process 500, when determining that the at least one topic associated with the first meeting is relevant to at least one individual associated with the second meeting, is to: identify, for a particular individual associated with the second meeting, a particular topic that is relevant to the particular individual and determine that the particular topic matches the at least one topic associated with the first meeting. In some implementations, the second meeting is identified from multiple meetings that were provided, as output, by the meeting relevance model.

In some implementations, the portion of the second meeting data associated with the second meeting includes data identifying the at least one individual associated with the second meeting.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
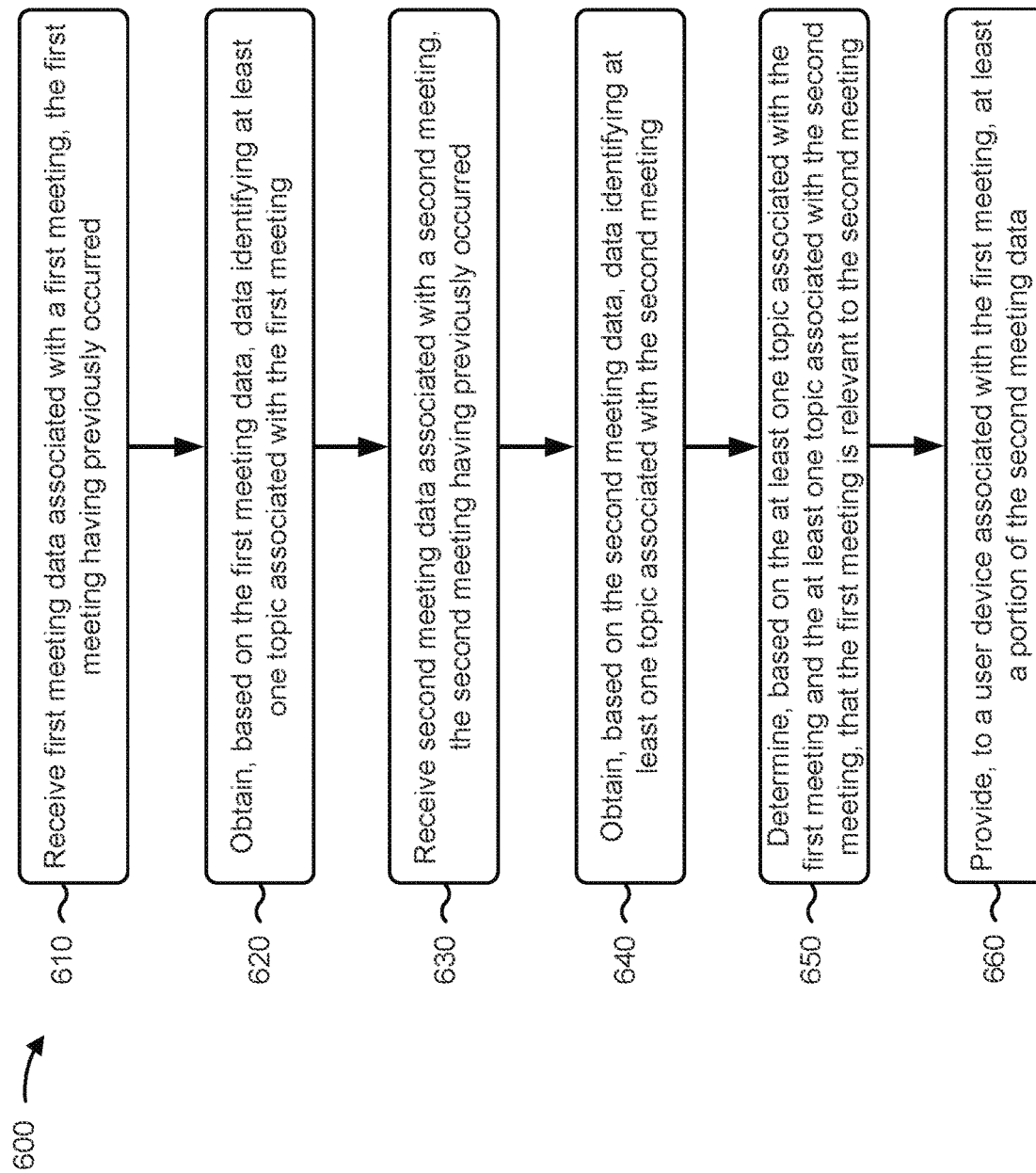

FIG. 6 is a flow chart of an example process 600 for managing meeting data. In some implementations, one or more process blocks of FIG. 6 may be performed by a meeting data management platform (e.g., meeting data management platform 230). In some implementations, one or more process blocks of FIG. 6 may be performed by another device or a group of devices separate from or including the meeting data management platform, such as a meeting data device (e.g., meeting data device 210), a language processing device (e.g., language processing device 220), a computing resource (e.g., computing resource 235), and/or a user device (e.g., user device 250).

As shown in FIG. 6, process 600 may include receiving first meeting data associated with a first meeting, the first meeting having previously occurred (block 610). For example, the meeting data management platform (e.g., using computing resource 235, processor 320, memory 330, storage component 340, input component 350, communications interface 370, and/or the like) may receive first meeting data associated with a first meeting, as described above in connection with FIG. 1. In some implementations, the first meeting previously occurred.

As further shown in FIG. 6, process 600 may include obtaining, based on the first meeting data, data identifying at least one topic associated with the first meeting (block 620). For example, the meeting data management platform (e.g., using computing resource 235, processor 320, memory 330, storage component 340, input component 350, communications interface 370, and/or the like) may obtain, based on the first meeting data, data identifying at least one topic associated with the first meeting, as described above in connection with FIG. 1.

As further shown in FIG. 6, process 600 may include receiving second meeting data associated with a second meeting, the second meeting having previously occurred (block 630). For example, the meeting data management platform (e.g., using computing resource 235, processor 320, memory 330, storage component 340, input component 350, communications interface 370, and/or the like) may receive second meeting data associated with a second meeting, as described above in connection with FIG. 1. In some implementations, the second meeting previously occurred.

As further shown in FIG. 6, process 600 may include obtaining, based on the second meeting data, data identifying at least one topic associated with the second meeting (block 640). For example, the meeting data management platform (e.g., using computing resource 235, processor 320, memory 330, storage component 340, input component 350, communications interface 370, and/or the like) may obtain, based on the second meeting data, data identifying at least one topic associated with the second meeting, as described above in connection with FIG. 1.

As further shown in FIG. 6, process 600 may include determining, based on the at least one topic associated with the first meeting and the at least one topic associated with the second meeting, that the first meeting is relevant to the second meeting (block 650). For example, the meeting data management platform (e.g., using computing resource 235, processor 320, memory 330, storage component 340, and/or the like) may determine, based on the at least one topic associated with the first meeting and the at least one topic associated with the second meeting, that the first meeting is relevant to the second meeting, as described above in connection with FIG. 1.

As further shown in FIG. 6, process 600 may include providing, to a user device associated with the first meeting, at least a portion of the second meeting data (block 660). For example, the meeting data management platform (e.g., using computing resource 235, processor 320, memory 330, storage component 340, output component 360, communications interface 370, and/or the like) may provide to a user device associated with the first meeting, at least a portion of second meeting data, as described above in connection with FIG. 1.

Process 600 may include additional implementations, such as any single implementation or any combination of implementations described below.

In some implementations, the at least one topic associated with the first meeting was derived from a first transcript associated with the first meeting and the at least one topic associated with the second meeting was derived from a second transcript associated with the second meeting.

In some implementations, the at least one topic associated with the first meeting was derived from a first subject associated with the first meeting and the at least one topic associated with the second meeting was derived from a second subject associated with the second meeting.

In some implementations, the at least one topic associated with the first meeting was derived from text included in a meeting invitation associated with the first meeting and the at least one topic associated with the second meeting was derived from text included in a meeting invitation associated with the second meeting.

In some implementations, process 600 may include providing the first meeting data to a language processing device; and providing the second meeting data to the language processing device. The data identifying the at least one topic associated with the first meeting is obtained from the language processing device, and the data identifying the at least one topic associated with the second meeting is obtained from the language processing device.

In some implementations, the portion of the second meeting data is included in data suggesting a third meeting, the data suggesting the third meeting including data identifying at least one individual associated with the first meeting and at least one individual associated with the second meeting.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, meeting data management platform 230 may facilitate the management of meeting data in a manner designed to increase the ease and efficiency of scheduling meetings and increase awareness between individuals regarding related meetings. For example, scheduling meetings may be made easier and more efficient than traditional manual meeting scheduling by suggesting individuals to be added to a meeting and/or suggesting content from previous meetings that can be included in a new meeting. Increased awareness between individuals may be provided by sharing information related to meetings between meetings and individuals associated with the meetings. Several different stages of the process for managing meeting data are automated, which can improve speed and efficiency of the process and conserve computing resources (e.g., processor resources, memory resources, and/or the like). Furthermore, implementations described herein use a rigorous, computerized process to perform tasks or roles that were not previously performed. Also, automating the process for managing meeting data conserves computing resources (e.g., processor resources, memory resources, and/or the like) that would otherwise be wasted by using manual processes for attempting to determine individuals who should be invited to a meeting, identify content relevant to include in a meeting invitation, notify individuals related to the meeting, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    obtaining, by a device, meeting data associated with a meeting;
    providing, by the device and to a topic model, the meeting data;
    determining, by the device, that the meeting is relevant to a particular topic,
        wherein determining that the meeting is relevant to the particular topic comprises:
            performing natural language processing on the meeting data to determine that the meeting is relevant to the particular topic;
    determining, by the device, that a particular individual is relevant to the particular topic,
        wherein determining that the particular individual is relevant to the particular topic comprises:
            determining that the particular individual is relevant to the particular topic based on data indicating how often the particular individual actively participated in other meetings associated with the particular topic; and
    providing, by the device and to another device associated with the particular individual, at least a portion of the meeting data.

2. The method of claim 1, wherein the meeting data includes at least one of:
    information identifying a subject associated with the meeting,
    information identifying an individual invited to the meeting,
    information identifying an individual attending the meeting,
    information identifying one or more roles associated with an individual invited to the meeting,
    information identifying one or more roles associated with an individual attending the meeting,
    information identifying one or more topics associated with the meeting,
    a recording associated with the meeting,
    a transcript associated with the meeting,
    text associated with a meeting invite associated with the meeting, or
    information associated with an attachment associated with the meeting.

3. The method of claim 1, wherein the topic model comprises a natural language processing model that has been trained to identify one or more topics associated with the meeting data.

4. The method of claim 1, wherein performing natural language processing on the meeting data comprises:
    performing natural language processing on a transcript included in the meeting data.

5. The method of claim 1, wherein determining that the particular individual is relevant to the particular topic further comprises:
    determining that the particular individual is relevant to the particular topic based on one or more topic labels previously associated with the particular individual.

6. The method of claim 1, wherein determining that the particular individual is relevant to the particular topic further comprises:
    determining that the particular individual is relevant to the particular topic based on a job title associated with the particular individual.

7. A device comprising:
    one or more memories; and
    one or more processors, communicatively coupled to the one or more memories, configured to:
        obtain meeting data associated with a meeting;
        provide, to a topic model, the meeting data;
        determine that the meeting is relevant to a particular topic,
            wherein the one or more processors, when determining that the meeting is relevant to the particular topic, are configured to:
                perform natural language processing on the meeting data to determine that the meeting is relevant to the particular topic;
        determine that a particular individual is relevant to the particular topic,
            wherein the one or more processors, when determining that the particular individual is relevant to the particular topic, are configured to:
                determine that the particular individual is relevant to the particular topic based on data indicating how often the particular individual actively participated in other meetings associated with the particular topic; and
        providing, to a user device associated with the meeting, at least one of:
            data suggesting that the particular individual be added to the meeting, or
            data suggesting that particular content, relevant to the particular topic, be added to the meeting.

8. The device of claim 7, wherein the meeting data includes at least one of:

information identifying a subject associated with the meeting, information identifying an individual invited to the meeting, information identifying an individual attending the meeting, information identifying one or more roles associated with an individual invited to the meeting, information identifying one or more roles associated with an individual attending the meeting, information identifying one or more topics associated with the meeting, a recording associated with the meeting, a transcript associated with the meeting, text associated with a meeting invite associated with the meeting, or information associated with an attachment associated with the meeting.

9. The device of claim 7, wherein the particular content comprises at least one of:

a transcript associated with a prior meeting, or an attachment associated with a prior meeting.

10. The device of claim 7, wherein the one or more processors, when performing natural language processing on the meeting data, are configured to:

perform natural language processing on a transcript included in the meeting data.

11. The device of claim 7, wherein the one or more processors, when determining that the particular individual is relevant to the particular topic, are further configured to:

determine that the particular individual is relevant to the particular topic based on one or more topic labels previously associated with the particular individual.

12. The device of claim 7, wherein the one or more processors, when determining that the particular individual is relevant to the particular topic, are further configured to:

determine that the particular individual is relevant to the particular topic based on a job title associated with the particular individual.

13. A non-transitory computer-readable medium storing a set of instructions, the set of instructions comprising:

one or more instructions that, when executed by one or more processors of a device, cause the device to:

obtain meeting data associated with a meeting;

provide, to a topic model, the meeting data;

determine that the meeting is relevant to a particular topic, wherein the one or more instructions, that cause the device to determine that the meeting is relevant to the particular topic, cause the device to:

perform natural language processing on the meeting data to determine that the meeting is relevant to the particular topic;

determine that a particular individual is relevant to the particular topic, wherein the one or more instructions, that cause the device to determine that the particular individual is relevant to the particular topic, cause the device to:

determine that the particular individual is relevant to the particular topic based on data indicating how often the particular individual actively participated in other meetings associated with the particular topic; and provide, to another device associated with the particular individual, at least a portion of the meeting data.

14. The non-transitory computer-readable medium of claim 13, wherein the meeting data includes at least one of:

information identifying a subject associated with the meeting, information identifying an individual invited to the meeting, information identifying an individual attending the meeting, information identifying one or more roles associated with an individual invited to the meeting, information identifying one or more roles associated with an individual attending the meeting, information identifying one or more topics associated with the meeting, a recording associated with the meeting, a transcript associated with the meeting, text associated with a meeting invite associated with the meeting, or information associated with an attachment associated with the meeting.

15. The non-transitory computer-readable medium of claim 13, wherein the topic model comprises a natural language processing model that has been trained to identify one or more topics associated with the meeting data.

16. The non-transitory computer-readable medium of claim 13, wherein the one or more instructions, that cause the device to perform natural language processing on the meeting data, cause the device to:

perform natural language processing on a transcript included in the meeting data.

17. The non-transitory computer-readable medium of claim 13, wherein the one or more instructions, that cause the device to determine that the particular individual is relevant to the particular topic, further cause the device to:

determine that the particular individual is relevant to the particular topic based on one or more topic labels previously associated with the particular individual.

18. The non-transitory computer-readable medium of claim 13, wherein the one or more instructions, that cause the device to determine that the particular individual is relevant to the particular topic, further cause the device to:

determine that the particular individual is relevant to the particular topic based on a job title associated with the particular individual.

* * * * *